United States Patent [19]
Angelo

[11] Patent Number: 5,146,724
[45] Date of Patent: Sep. 15, 1992

[54] TWO-PART CLAMP FOR CONNECTING INTERSECTING I-BEAMS

[75] Inventor: Arthur Angelo, Poway, Calif.

[73] Assignee: Intertrack Management, Inc., San Diego, Calif.

[21] Appl. No.: 680,133

[22] Filed: Apr. 3, 1991

[51] Int. Cl.⁵ .............................................. E02D 27/42
[52] U.S. Cl. .................... 52/299; 52/DIG. 11; 52/665; 52/741; 52/772; 403/387; 248/229
[58] Field of Search ............... 52/167 R, 167 CB, 484, 52/489, 485, 712, 715, 483, 763, 772, 741, 746, DIG. 11, 292, 299, 665; 403/387, 400; 248/228, 229, 510

[56] References Cited

U.S. PATENT DOCUMENTS

| | | | |
|---|---|---|---|
| 3,144,105 | 8/1964 | Capek | 403/387 |
| 3,998,419 | 12/1976 | Semmerling | 52/484 X |
| 4,358,216 | 11/1982 | Pleickhardt et al. | 403/387 |
| 4,379,651 | 4/1983 | Nagashima | 403/387 |
| 4,404,780 | 9/1983 | Josephson | 52/DIG. 11 X |
| 4,444,524 | 4/1984 | Cook et al. | 403/387 |
| 4,490,066 | 12/1984 | Hanlon | 403/387 |
| 4,610,562 | 9/1986 | Dunn | 52/665 X |
| 4,630,423 | 12/1986 | Lind | 52/484 |
| 4,798,029 | 1/1989 | Carlton | 403/387 X |
| 4,937,989 | 7/1990 | Miyares et al. | 52/299 X |

Primary Examiner—David A. Scherbel
Assistant Examiner—Creighton Smith
Attorney, Agent, or Firm—L. Arnold Thaxton

[57] ABSTRACT

A two-part clamping assembly and method for applying the clamping assembly to intersecting I-beams is disclosed. The clamping assembly is particularly beneficial at uniting the undercarriage I-beams of a mobile dwelling to intersectingly smaller I-beams of an auxiliary support system, during moderate and/or severe seismic disturbances. The clamping assembly includes a two-part connector designed to tightly engage the upper flange of the lower and smaller I-beam in such a manner that a clamp-lip horizontally protrudes over and is parallel to the bottom flange of the upper undercarriage I-beam. The clamp-lip is engaged at the bottom flange to the undercarriage I-beam, in the event of an earthquake, enabling the undercarriage I-beams to pickup the auxiliary support system. At the cessation of quake conditions, the undercarriage I-beams are reposited to the I-beam of the auxiliary and emergency support system. The clamping assembly, thus, serves to prevent the mobile dwelling from shifting or falling off its pier support system during seismic tremors.

6 Claims, 3 Drawing Sheets

TWO-PART CLAMP FOR CONNECTING INTERSECTING I-BEAMS

FIELD OF THE INVENTION

This invention relates generally to a device for providing a connector to intersecting I-beams at a juncture where the beams overlap. More particularly, this invention is directed at a two-part clamping device that securely engages the top flange of a lower and smaller I-beam while simultaneously and abuttingly impends to the lower flange of an upper and larger I-beam. It is especially intended that the clamping device of this invention be used as a safety connector, on the occasion of an earthquake emergency, but otherwise in a state of readiness, to the intersecting I-beams of buildings erected without sub-surface foundation and above ground, such as mobile dwellings.

BACKGROUND OF THE INVENTION

Most typically building structures, such as mobile homes, are supported and levelled above ground surface by means of piers located beneath the building. Parallel and lengthwise I-beams compose the essential load-bearing feature of the mobile home's undercarriage structure. Ordinarily, pier assemblies are positioned at the underside of the I-beams throughout the undercarriage. On the occasion of ground vibrations or seismic tremors, however, mobile homes have been known to shift off their supporting piers, effecting damage to occupants and property alike.

In U.S. Pat. No. 4,937,989, issued to the applicant herein along with two co-inventors on Jul. 3, 1990, there is disclosed a mobile home support system comprised of a locking brace and clamping type piers that laterally restrain the I-beams from shifting off such piers. Thus, the present invention is specifically designed as a significant adjunct to the support system disclosed in the '989 patent, particularly the pier structure themselves. In essence the inventive clamping device operates as a key element that integrates a backup support system which is ancillary to the pier support set forth in the '989 patented disclosure. It has now been discovered that the mobile dwelling is even more securely supported during earthquakes, when a seismic cradle co-operates with the locking piers. The seismic cradle unit consists of a somewhat (1) smaller I-beam relative to the mobile dwelling/undercarriage I-beams, (2) two end-opposing stanchions, and (3) a separable two-part clamp. The two-part clamp is securely attached to the top flange of the smaller I-beam and abuttingly impends to the lower flange of the intersectingly upper I-beam.

To an appreciable degree, the prior art indicates that the building construction industry has been favorably cognizant of two-part clamps for uniting I-beams. Such awareness is reflected in U.S. Pat. No. 3,144,105 which issued on Aug. 11, 1964 to R. Capek. The patentee discloses a separable two-part I-beam clamp that securely engages some intersectingly intermediate site of two distinct I-beams. M. Nagashima, in U.S. Pat. No. 4,379,651 and issuing on Apr. 12, 1983, discloses a multipart clamping device for attaching overlapping I-beams.

It is clearly seen that the clamping devices set forth in each patent is directed at tightly securing the intersecting I-beams, one to the other. Neither of the patented devices, however, show a separable two-part clamp disposed with a clamp-lip at one end, nor do these patents even suggest any use for such a lip arrangement.

The two-part I-beam clamp of the present invention is intended to remain tightly engaged to the top flange of a smaller I-beam while a L-shaped clamp-lip remains impending or fixedly hovering over the bottom flange of an intersectingly upper and larger I-beam, also termed the undercarriage I-beam. It is during seismic distrubances and under the conditions where the mobile dwelling undercarriage-beams vibrate, that the clamp-lip is engaged and causes the entire seismic cradle to move with the mobile dwelling. Hence, when the disturbance ceases, the undercarriage I-beams resume their position relative to the smaller I-beams of the seismic cradle. The undercarriage I-beams, while vibrating, literally pickup the seismic cradle by the lip of the inventive clamp, causing the cradle to move with the complete mobile dwelling.

Accordingly, it is a general object of this invention to provide a clamp for tightly engaging a comparably small I-beam at its upper flange while simultaneously providing a lip that impends in a state of readiness above the bottom flange of a somewhat larger I-beam that is overlapping the smaller I-beam.

It is another object of this invention to provide a method wherein a clamp interengages an auxiliary backup/support system during seismic tremors.

It is an additional object of the present invention to provide an arrangement of identical clamps, abuttingly disposed to and impending above the bottom flange of an upper and somewhat larger I-beam, that effectuates an escape-proof channel for the larger I-beam during seismic disturbances.

Other objects and advantages will become apparent on referral to the drawings and detailed description.

SUMMARY OF THE INVENTION

The clamping assembly of this invention is a major element in a system designed for interengaging the undercarriage I-beams of a mobile dwelling with the intersectingly smaller I-beams of a seismic cradle during ground disturbances.

Hence, the objects of this invention are accomplished, in one embodiment, through the use of a pair of two-part clamping assemblies, each clamp situated in opposition to the other and both interposed by an undercarriage i-beam. One end of each clamp opposingly and abuttingly impends the bottom flange of the undercarriage I-beam. A second end of each clamp is tightly engaged to the upper flange of an intersectingly smaller I-beam, by means of threaded nuts and bolts. The smaller I-beam is supported above ground surface on stanchions fastened at opposite ends thereto.

In an alternative embodiment, the clamping assembly of this invention is also intended to abuttingly impend the bottom flange of an undercarriage I-beam, on one side of the I-beam, while a stanchion is juxtaposed to the bottom and top flanges at the other side of the undercarriage I-beam. Here, as in the first embodiment, the stanchion and clamp is not tightly fastened to the undercarriage I-beam. The unique clamp of this invention is designed to interengage an auxiliary support system or seismic cradle for the undercarriage I-beam of a mobile dwelling during a moderate and/or severe seismic disturbance. In the absence of ground tremors, the undercarriage I-beams remsin in close proximity to the intersectingly smaller I-beam of the seismic cradle or auxiliary and emergency support system, along with the piers described in the '989 patent supra.

Experimentation has demonstrated it to be an optional feature of installation, predicated more on convenience than requirement, with respect to interfacing the upper and lower I-beams. Thus, the upper undercarriage I-beams and lower cradle I-beams may be clampingly separated by a distance of 0–2 inches, since it is preferable that the normative, dead-load weight of the mobile dwelling rest entirely upon its piers. It is the pliable quality exhibited by the undercarriage I-beams, under the stress of moderate and/or severe earthquakes, that effects a transient weight dependency by the undercarriage I-beams onto the seismic cradle/I-beams. Hence, the clamp assembly is a major participant in the seismic cradle system that becomes fully actuated during an emergency precipitated by earthquakes.

Owe to the vibratory disposition of the undercarriage I-beams during seismic disturbances, the clamping assembly permits the undercarriage beams to pickup and move the seismic cradle in any direction experienced by the undercarriage beams themselves. The clamp-lip, of the invention impends from $\frac{1}{2}$ to 2 inches above the bottom flange of the undercarriage I-beam. The configuration of the clamp-lip presents minimal, if any, dynamic impingement to the clamp during seismic disturbances. During events of vibratory stress the unique clamp-lip, relative to the upper flange of the cradle I-beam, provides an adequately confined channel/space that tolerates movement in the undercarriage beam, but simultaneously, inhibits any disengagement of that beam from the cradle structure.

A better understanding of the subject invention will be enabled when the following written description is read in conjunction with the appended drawings.

DETAILED DESCRIPTION OF THE INVENTION

Figure 1:
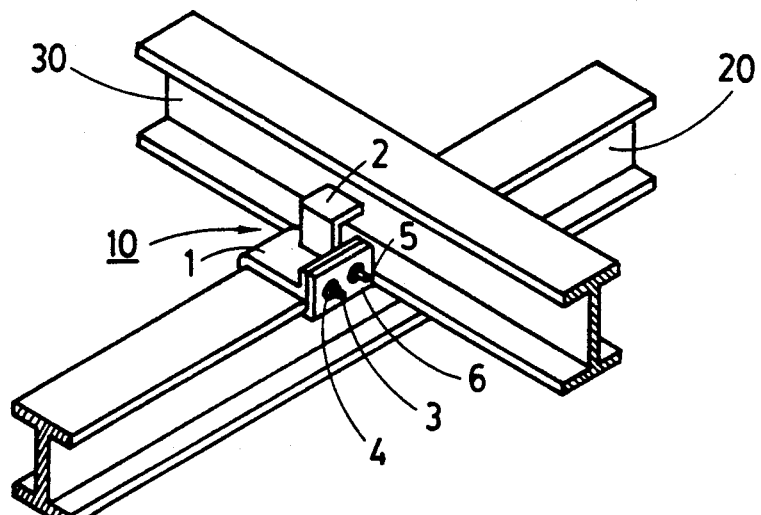
FIG. 1 is a perspective view of one embodiment to this invention where the clamp is tightly assembled on a smaller I-beam while impending at an overlapping larger I-beam, and the other clamp being opposingly situated but not shown.
Figure 2:
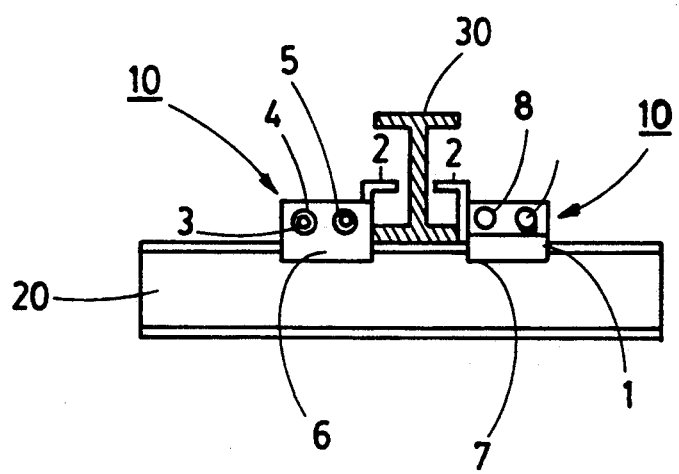
FIG. 2 is a side view of the general structure of FIG. 1 illustrating the assemblage of two opposing clamps relative to their upper and lower I-beams.
Figure 3:
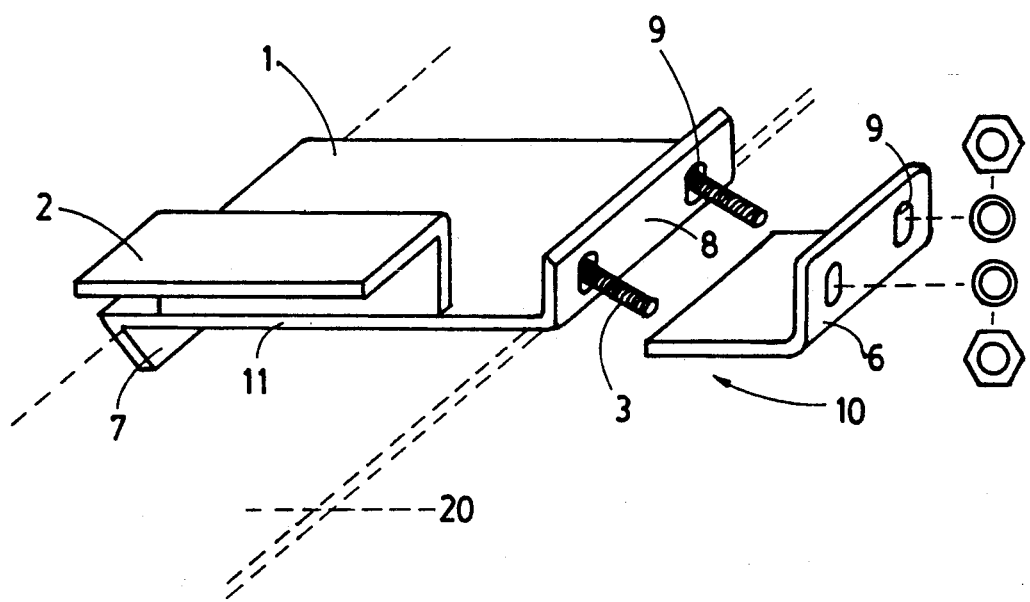
FIG. 3 is a perspective view of the two-part clamp of this invention, shown disposed to the upper flange-face, in phantom lines, of the smaller I-beam to FIG. 1.
Figure 4:
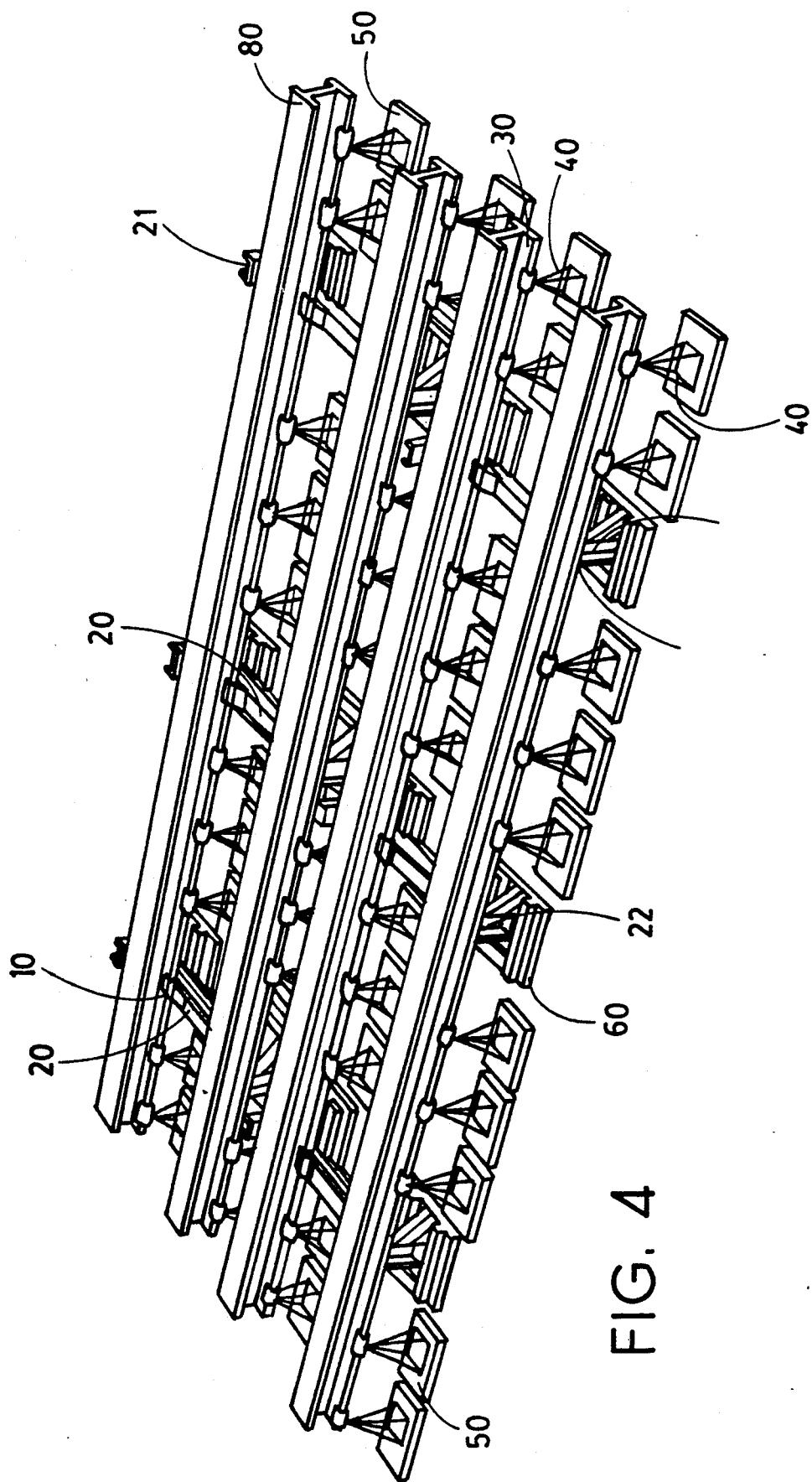
FIG. 4 is a somewhat diagrammatic view to illustrate one embodiment employing the inventive clamping assembly in opposition to the stanchion member of seismic cradle.

Referring now to the drawings, wherein like numerals refer to like parts throughout the several views, and in particular to FIGS. 1, 2, and 4, wherein there is illustrated two intersecting and horizontally disposed, load-bearing I-beams. The mobile dwelling undercarriage I-beam 30 is intersected beneath and is adjacent to the seismic cradle I-beam 20 in a flange-to-flange or face-to-face type arrangement. The seismic cradle beam 20 is approximately four inches across each flange, and about four and a half inches at its vertical web. Each of beams 20 has a stanchion 21 at its opposite ends. Two opposing stanchions 21 fixedly support a beam 20 above ground and adjacently beneath beams 30. A stock material undercarriage I-beam 30 is approximately eight inches across its top and bottom flanges respectively, and about ten inches at the web height. In accordance with one embodiment of the invention, at least two clamping assemblies 10 are used to interengage I-beam 20 to the undercarriage I-beam 30. Each clamping assembly 10 is comprised of a rectangularly shaped flat plate 1, which can be considered the main portion of the clamp assembly, having a contiguous L-shaped lip 2 situated at one end of plate 1 by extending first vertically upward and terminating horizontally away from plate 1. Thus, lip 2 consists of a protruding tongue existing in a parallel plane to plate 1 and the sundry flanges of I-beams 20 and 30. As best shown in FIG. 3, clockwise and essentially at a right-planar angle to lip 2, plate 1 is further disposed with an integrally and downwardly curved lip 7. Counter-clockwise and also forming a right-planar angle to lip 2, is situated a vertically upturned end 8 that proceeds integrally and vertically from plate 1. End 8 contains two intermediately positioned apertures 9. Clamping assembly 10 is further comprised of an L-shaped bracket 6 that also contains two intermediately positioned apertures 9 in its upturned end 8. L-shaped bracket 6 and end 8 are mattingly commensurate such that each pair of apertures 9 co-operate in comfortable alignment when plate 1 is joined with bracket 6 by means of a fastening set consisting of bolts 3, washers 5, and hex nuts 4.

In operation, a pair of two-part clamping assemblies 10, are each separated into plate 1 and bracket 6. Plate 1 is caused to engage one flange/edge of I-beam 20 by means of lip 7. Thus mounted, plate 1 is adjacently positioned, at its edge 11, against the bottom flange edge of I-beam 30. The bottom portion of L-shaped bracket 6 is disposed to the underside and edge of the I-beam 20 upper flange. Bracket 6 is tightly secured to plate 1 at upturned end 8 by inserting bolts 3 through each aligned apertures 9 followed by washers 5 and hex nuts 4. A pair of clamping assemblies 10, positioned in this fashion, exist in a condition of readiness since a pair of opposing clamp lip 2 horizontally protrude over the bottom flange to I-beam 30. It is to be appreciated that when the mobile dwelling is in a dead-load mode, each of lip 2 does not engage any portion of the bottom flange to beam 30. Conversely, the vibrations of the I-beam 30, set into play during moderate and/or severe seismic disturbances and effecting a live-load, are sufficient to cause the engagement of lip 2 to the bottom flange of beam 30. These opposing and clamping assemblies provide a channel, during a tremor, such that each lip 2 equally engages the bottom flange of I-beam 30, permitting no escape from beam 20 therebeneath. It is the configurational presence of lip 2 on plate 1, so designed to account for the seismically imposed dynamic stresses to beam 30, that such stresses are inadequate at separating beams 20 from beams 30. Hence, beam 20 becomes substantially attached to beam 30 via lip 2 of clamp 10, exemplary during earthquakes, to the extent that beam 30 is invariably reposited to the beam 20 upper flange at the quake's cessation. It has been witnessed that when a plurality of clamping assemblies 10 are arranged on I-beam 20 and 30, as described herein, mobile dwellings do not fall to the ground during seismic tremors, thus, preventing damage to humans and property. It is significant to declare here, that two opposing clamps 10 are required only when I-beam 20 interfaces three or more undercarriage I-beams 30 and no stanchion 21 abuts at least one side of an I-beam 30.

Referring now to FIG. 4, wherein a related embodiment to the present invention is illustrated in a diagrammatic view. Here it is seen that the seismic cradel which comprises a horizontal I-beam 20 disposed with a stanchion 21 at each end of I-beam 20, is thus equipped with one clamping assembly 10. One clamping assembly 10 resides opposite each stanchion 21. A stanchion 21 is fastended, above ground surface, at each end of beam 20. Through a combination of pressure treated ground pads 60 and a plurality of regularly spaced apertures 22 vertically arranged in stanchion 21, beam 20 is rendered height adjustable such that the top face-flange of beam 20 is adjacent the bottom face-flange of beam 30 at their point of intersection. Edge 11 of clamp assembly 10 is juxtaposed against the beam 30 bottom flange having lip 2 impending thereabove. Clamping assembly 10 is tightly secured to beam 20 as earlier described. In this embodiment, the bottom flange of beam 30 is sandwiched or interposed between a rigidly situated stanchion 21 at one side and clamping assembly 10 at the direct opposite side. It is contemplated that the seismic cradle assemblies be serially located throughout the intermediary length of I-beam 30, but never at the end of the beams 30. Piers 40, resting at their base on pressure treated pads 50, are clampingly attached at their apex to the bottom flange of the beams 30. While piers 40, accompanied by their pads 50, are dispersedly attached throughout the undercarriage I-beams 30, it is highly desirous to attach the piers 40 at the end of beams 30.

In keeping with current technology, it is appreciated that all elements of this invention be constructed of iron, steel, or other such formidable material.

In compliance with the statues so governoring, the invention for a clamping assembly has been set forth in language more or less specific in accounting for structural, functional, and component features. However, it is understood that the invention is not limited to the specific features shown but that means and construction herein disclosed comprises a preferred form of executing the invention, while numerous modifications of the disclosed embodiments will undoubtedly occur to those of skill and interest in the art, such modifications are deemed pertinent to the spirit of the invention. Thus, the scope of this invention is to be limited solely in light of the appended claims.

I claim:

1. A clamping assembly for a mobile dwelling auxiliary support system, adapted to become fully actuated during seismic disturbances, in uniting two structural and angularly intersecting I-beams that are horizontally adjacent to one another at the bottom flange of said upper I-beam to the upper flange of said lower I-beam, said assembly comprising:

a rigid rectangular two-part connector defined by:
   a first part consisting of a flat plate member having a contiguous L-shaped lip that extends first vertically upward while terminating horizontally away from said plate surface, and situated at one end of said plate, while clockwise to said lip and at a right-planar angle thereto a second integrally and downwardly curved lip arrangement, and at a counter-clockwise right-planar angle to said L-shaped lip is further disposed a vertically upturned end of said plate wherein two apertures are intermediately situated;

a second part consisting of a L-shaped bracket having a horizontally flat surface while contiguously depending from said surface member is an upturned ridge containing two intermediately disposed apertures mattingly commensurate to cooperate with said plate apertures; and a pair of bolts, washers, and nuts suitable to tightly fasten said plate to said bracket through their common apertures.

2. A clamping assembly according to claim 1, wherein said assembly tightly engages the upper flange of said lower beam and is in juxtaposition to the bottom flange of said upper beam such that said L-shaped lip protrudes over and is in parallel plane to the bottom flange of said upper beam.

3. A clamping assembly according to claim 1, wherein said assembly is juxtaposed to the bottom flange of said upper beam that comprises a part of the undercarriage I-beam system to said mobile dwelling.

4. A clamping assembly according to claim 1, wherein said assembly is engaged to the upper flange of said lower I-beam that comprises a part of said auxiliary cradle support to said upper beam.

5. A method for locating two clamping assemblies at each side of a mobile dwelling undercarriage I-beam and onto an intersectingly smaller support I-beam, said smaller beam containing end opposed stanchions, said method comprising tightly securing said oppositely disposed assemblies to the upper flange of said smaller beam such that a lip protruding from each of said assemblies impends over and is parallel to the lower flange of said interposing undercarriage beam, wherein each of said assemblies, being identical, is defined by:

a rigid rectangular two-part connector consisting of:
   a first part being a flat plate member having a contiguous L-shaped lip that extends first vertically upward while terminating horizontally away from said palte and situated at one end of said plate, disposed clockwise to said lip and at a right-planar angle thereto a second integrally and downwardly curved lip arrangement, and at a counter-clockwise right-planar angle to said L-shaped lip there is further situated a vertically upturned end of said plate wherein two apertures are intermediately situated;

a second part being a L-shaped bracket having a horizontally flat surface while contiguously depending from said surface member is an upturned ridge containing two intermediately disposed apertures mattingly commensurate to cooperate with said plate apertures; and a pair of bolts, washers, and nuts suitable to tightly fasten each of said plates to each of said brackets through their common apertures.

6. A method for locating a clamping assembly to one side of a mobile dwelling undercarriage I-beam and onto an intersectingly smaller support I-beam, said smaller beam containing end opposed stanchions, said method comprising tightly securing said assembly to the upper flange of said smaller beam such that a lip protruding from said assembly impends over and is parallel to the lower flange of said interposing undercarriage beam that is disposed with one of said stanchions directly opposite said assembly wherein said stanchion abuts both upper and lower flanges of said undercarriage beam, and said clamping assembly being defined by:

a rigid rectangular two-part connector consisting of:
   a first part being a flat plate member having a contiguous L-shaped lip that extends first vertically upward while terminating horizontally away from said plate and situated at one end of said plate, disposed clockwise to said L-shaped lip and at a right-planar angle thereto a second integrally and downwardly curved lip arrangement, and at a counter-clockwise right-planar angle to said L-shaped lip there is further situated a vertically upturned end of said plate wherein two apertures are intermediately situated;

a second part being a L-shaped bracket having a horizontally flat surface from which an upturned ridge contiguously depends, said ridge containing two intermediately disposed apertures mattingly commensurate to cooperate with said plate apertures; and a pair of bolts, washer, and nuts suitable to tightly fasten said plate to said bracket through their common apertures.

* * * * *